US011860453B2

(12) United States Patent
Saha et al.

(10) Patent No.: US 11,860,453 B2
(45) Date of Patent: Jan. 2, 2024

(54) METHODS OF MANUFACTURING AN OPHTHALMIC LENS

(71) Applicant: CooperVision International Limited, Fareham (GB)

(72) Inventors: Sourav Saha, Pleasanton, CA (US); Paul Chamberlain, Livermore, CA (US); Arthur Bradley, Bloomington, IN (US); Baskar Arumugam, Dublin, CA (US)

(73) Assignee: COOPERVISION INTERNATIONAL LIMITED, Fareham (GB)

( * ) Notice: Subject to any disclaimer, the term of this patent is extended or adjusted under 35 U.S.C. 154(b) by 0 days.

(21) Appl. No.: 17/870,872

(22) Filed: Jul. 22, 2022

(65) Prior Publication Data

US 2023/0031417 A1    Feb. 2, 2023

Related U.S. Application Data

(60) Provisional application No. 63/227,376, filed on Jul. 30, 2021.

(51) Int. Cl.
    *G02C 7/02*    (2006.01)

(52) U.S. Cl.
    CPC ............. *G02C 7/022* (2013.01); *G02C 7/024* (2013.01); *G02C 2202/12* (2013.01)

(58) Field of Classification Search
    CPC .... G02C 7/022; G02C 7/024; G02C 2202/12; B29D 11/00038; B29D 11/00317; B29D 11/00355; B29D 11/0073; B29D 11/00788; B29D 11/00009; B29D 11/00865; G02B 3/0087

USPC ..................................................... 351/159.01
See application file for complete search history.

(56) References Cited

U.S. PATENT DOCUMENTS

| | | | |
|---|---|---|---|
| 7,935,212 B2 * | 5/2011 | Jiang ................ | B29D 11/00355 156/273.7 |
| 9,726,907 B2 * | 8/2017 | Quiroga ................ | G02F 1/1334 |
| 2003/0003295 A1 | 1/2003 | Dreher et al. | |
| 2007/0171359 A1 | 7/2007 | Dreher | |

(Continued)

FOREIGN PATENT DOCUMENTS

| | | |
|---|---|---|
| CN | 110770007 A | 2/2020 |
| CN | 111886535 A | 11/2020 |

(Continued)

OTHER PUBLICATIONS

Partial Search Report issued in corresponding International Patent Application No. PCT/GB2022/051979 dated Oct. 14, 2022 (11 pages).

(Continued)

*Primary Examiner* — William R Alexander
(74) *Attorney, Agent, or Firm* — Kilyk & Bowersox, P.L.L.C.

(57) ABSTRACT

Methods of manufacturing an ophthalmic lens are described. The methods include a step of providing an ophthalmic lens; and a step of providing a photocurable film. The methods use a digital light projections system to photocure at least one region of the film to produce at least one photocured gradient index refractive element. The film is applied to a surface of the lens.

18 Claims, 11 Drawing Sheets

(56) References Cited

U.S. PATENT DOCUMENTS

| | | | |
|---|---|---|---|
| 2008/0023137 A1* | 1/2008 | Jiang | G02C 7/02 |
| | | | 156/701 |
| 2016/0377886 A1* | 12/2016 | Quiroga | G02F 1/132 |
| | | | 351/159.73 |
| 2019/0391411 A1 | 12/2019 | Kelch et al. | |
| 2020/0159041 A1 | 5/2020 | Conte et al. | |
| 2021/0048690 A1 | 2/2021 | Guillot et al. | |

FOREIGN PATENT DOCUMENTS

| | | |
|---|---|---|
| EP | 2067613 A1 | 10/2009 |
| WO | 2007109308 A1 | 9/2007 |
| WO | 2020180817 A1 | 9/2020 |

OTHER PUBLICATIONS

Combined Search and Examination Report issued in corresponding United Kingdom Patent Application No. GB2210988.8 dated Jan. 24, 2023 (5 pages).

Office Action issued in corresponding Taiwan Patent Application No. 111128504 dated Jul. 6, 2023 (with English translation)(15 pages).

PCT Demand filed May 23, 2023 in corresponding International Patent Application No. PCT/GB2022/051979 (15 pages).

International Preliminary Report on Patentability issued in corresponding International Patent Application No. PCT/GB2022/051979 dated Jul. 7, 2023 (13 pages).

* cited by examiner

METHODS OF MANUFACTURING AN OPHTHALMIC LENS

This application claims the benefit under 35 U. S.C. § 119(e) of prior U.S. Provisional Patent Application No. 63/227,376, filed Jul. 30, 2021, which is incorporated in its entirety by reference herein.

The present disclosure concerns methods of manufacturing an ophthalmic lens, the lens having a film applied to its surface, wherein the film includes at least one gradient index optical element that has been photocured using digital light projection (DLP) technology.

BACKGROUND

Many people, including children and adults require ophthalmic lenses to correct for myopia (short-sightedness), and many adults require ophthalmic lenses to correct for presbyopia (an age-related inability to accommodate and hence inability to focus on near objects). Ophthalmic lenses may also be required to correct for hyperopia (far-sightedness), astigmatism, or keratoconus (a condition whereby the cornea gradually bulges to form a cone shape).

Myopia (short-sightedness) affects a significant number of people including children and adults. Myopic eyes focus incoming light from distant objects to a location in front of the retina. Consequently, the light converges towards a plane in front of the retina and diverges towards, and is out of focus upon arrival at, the retina. Conventional lenses (e.g., spectacle lenses and contact lenses) for correcting myopia reduce the convergence (for contact lenses), or cause divergence (for spectacle lenses) of incoming light from distant objects before it reaches the eye, so that the location of the focus is shifted onto the retina.

It was suggested several decades ago that progression of myopia in children or young people could be slowed or prevented by under-correcting, i.e. moving the focus towards but not quite onto the retina. However, that approach necessarily results in degraded distance vision compared with the vision obtained with a lens that fully corrects for myopia. Moreover, it is now regarded as doubtful that under-correction is effective in controlling developing myopia. A more recent approach is to provide lenses having both regions that provide full correction of distance vision and regions that under-correct, or deliberately induce, myopic defocus. Lenses may also be provided that increase scattering of light in certain regions, compared to light passing through the fully correcting region of the lens. It has been suggested that these approaches can prevent or slow down the development or progression of myopia in children or young people, whilst providing good distance vision.

In the case of lenses having a region that provide defocus, the regions that provide full-correction of distance vision are usually referred to as base power regions and the regions that provide under-correction or deliberately induce myopic defocus are usually referred to as add power regions or myopic defocus regions (because the dioptric power is more positive, or less negative, than the power of the distance regions). A surface (typically the anterior surface) of the add power region(s) has a smaller radius of curvature than that of the distance power region(s) and therefore provides a more positive or less negative power to the eye. The add power region(s) are designed to focus incoming parallel light (i.e., light from a distance) within the eye in front of the retina (i.e., closer to the lens), whilst the distance power region(s) are designed to focus light and form an image at the retina (i.e., further away from the lens).

In the case of lenses that increase scattering of light in a certain region, features that increase scattering may be introduced into a lens surface or may be introduced into the material that is used to form the lens. For example, scattering elements may be burned into the lens, or embedded in the lens. Scattering elements may be laser ablated optical elements embedded in the lens material.

A known type of contact lens that reduces the progression of myopia is a dual-focus contact lens, available under the name of MISIGHT (CooperVision, Inc.). This dual-focus lens is different than bifocal or multifocal contact lenses configured to improve the vision of presbyopes, in that the dual-focus lens is configured with certain optical dimensions to enable a person who is able to accommodate to use the distance correction (i.e., the base power) for viewing both distant objects and near objects. The treatment zones of the dual-focus lens that have the add power also provide a myopically defocused image at both distant and near viewing distances.

Whilst these lenses have been found to be beneficial in preventing or slowing down the development or progression of myopia, annular add power regions can give rise to unwanted visual side effects. Light that is focused by the annular add power regions in front of the retina diverges from the focus to form a defocused annulus at the retina. Wearers of these lenses therefore may see a ring or 'halo' surrounding images that are formed on the retina, particularly for small bright objects such as street lights and car headlights. Also, rather than using the natural accommodation of the eye (i.e., the eye's natural ability to change focal length) to bring nearby objects into focus, in theory, wearers can make use of the additional focus in front of the retina that results from the annular add power region to focus near objects; in other words, wearers can inadvertently use the lenses in the same manner as presbyopia correction lenses are used, which is undesirable for young subjects.

Further lenses have been developed which can be used in the treatment of myopia, and which are designed to eliminate the halo that is observed around focused distance images in the MISIGHT (CooperVision, Inc.) lenses and other similar lenses described above. In these lenses, the annular region is configured such that no single, on-axis image is formed in front of the retina, thereby preventing such an image from being used to avoid the need for the eye to accommodate near targets. Rather, distant point light sources are imaged by the annular region to a ring-shaped focal line at a near add power focal surface, leading to a small spot size of light, without a surrounding 'halo' effect, on the retina at a distance focal surface.

It has been recognised that known lenses that include treatment portions for introducing myopic defocus are typically designed to provide a specific treatment to a lens wearer. The lenses may be expensive and complex in design, and over time, if the lens wearer's requirements change, they may need to purchase different lenses providing different levels of correction. The present invention seeks to provide a simple and cost effective method of manufacturing lenses for use in preventing or slowing of the worsening of myopia. Such lenses may also be beneficial in correcting or improving vision associated with presbyopia, hyperopia, astigmatism, keratoconus or other refractive anomalies.

SUMMARY

According to a first aspect, the present disclosure provides a method of manufacturing an ophthalmic lens. The method comprises providing an ophthalmic lens, and providing a photocurable film. The method comprises using a digital light projection system to photocure at least one region of the film, thereby producing at least one photocured gradient index refractive element. The method comprises applying the film to a surface of the lens.

It will of course be appreciated that features described in relation to one aspect of the present disclosure may be incorporated into other aspects of the present disclosure.

DETAILED DESCRIPTION

Figure 1:
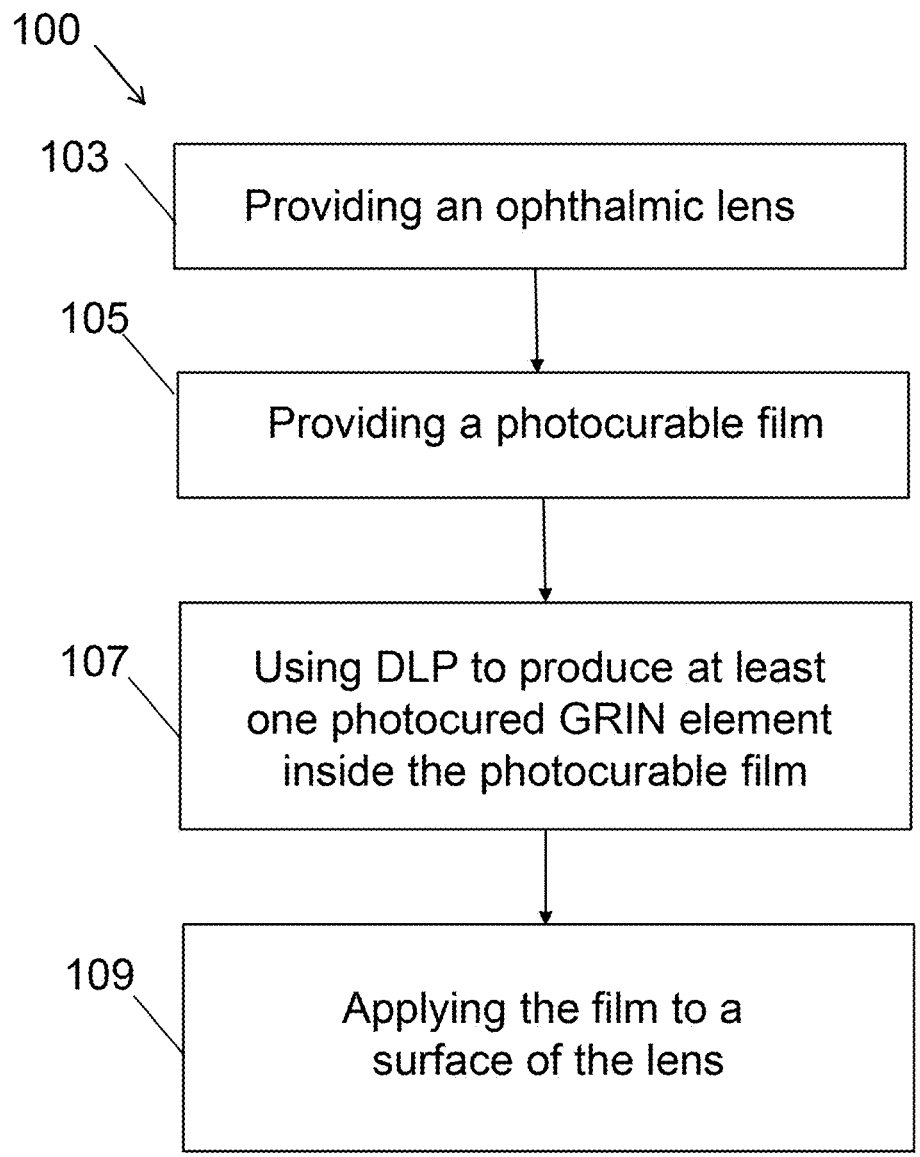
FIG. 1 is a flow chart showing a method of manufacturing an ophthalmic lens, according to an embodiment of the present disclosure.

According to a first aspect, the present disclosure provides a method of manufacturing an ophthalmic lens. The method comprises providing an ophthalmic lens, and providing a photocurable film. The method comprises using a digital light projection system to photocure at least one region of the film, thereby producing at least one photocured gradient index refractive element. The method comprises applying the film to a surface of the lens.

The film may be a cross-linked polymeric film. The film may be a thin film. The film may have been formed from a matrix of uncross linked polymers. The film may be a Bayfol® HX film. The film may have a uniform thickness.

The base refractive index of the film may be constant. The base refractive index of the film may be between 1.3 and 1.8, preferably about 1.5. Each of the at least one GRIN optical elements may have an average refractive power that is greater than the base refractive power. Alternatively, each of the at least one GRIN optical elements may have an average refractive power that is less than the base refractive power.

In the context of the present disclosure, each of the at least one gradient index (GRIN) optical elements is an element that has a varying refractive index. The variation in refractive index may be a transverse variation in refractive index across the element, i.e. in a direction that runs parallel to a surface of the film. The variation in refractive index may be a radial variation in refractive index, i.e., the refractive index may vary extending radially outwardly from a point. Each of the at least one GRIN optical elements may have a transverse variation in refractive index and an axial variation in refractive index. The variation in refractive index of each of the at least one GRIN optical elements may be a linearly varying gradient in refractive index, or a gradient that has a varying profile defined by a quadratic function.

The GRIN elements may be lenses. Advantageously, the GRIN elements may provide defocusing. It is believed that defocusing may help to prevent or slow of the worsening of myopia. It is believed that defocusing may help to correct or improve vision associated with presbyopia, hyperopia, astigmatism, keratoconus or other refractive anomalies.

Each of the at least one GRIN optical elements may give rise to additional scattering of light that falls incident on the GRIN optical element, compared to light falling incident on the remainder of the film.

Alternatively, each of the at least one GRIN optical elements may give rise to reduced scattering of light that falls incident on the GRIN optical element, compared to light falling incident on the remainder of the film. Each of the at least one GRIN optical elements may have a minimum change in refractive index, compared to the base refractive index, of at least 0.001, preferably at least 0.005. Each of the at least one GRIN optical elements may have a minimum refractive index that is 0.001 greater than the base refractive index. Each of the at least one GRIN optical elements may have a minimum refractive index that is 0.005 greater than the base refractive index. Each of the at least one GRIN optical elements may have a maximum refractive index that is 0.005 less than the base refractive index. Each of the at least one GRIN optical elements may have a maximum refractive index that is 0.001 less than the base refractive index. Each of the at least one GRIN optical elements may have a maximum change in refractive index, compared to the base refractive index of less than 0.1, preferably less than 0.025. Each of the at least one GRIN optical elements may have a maximum refractive index that is 0.1 greater than the base refractive index. Each of the at least one GRIN optical elements may have a maximum refractive index that is 0.025 greater than the base refractive index. Each of the at least one GRIN optical elements may have a minimum refractive index that is 0.1 less than the base refractive index. Each of the at least one GRIN optical elements may have a minimum refractive index that is 0.025 less than the base refractive index. Each of the at least one GRIN optical elements may have a minimum refractive power that is between −25 D and 25 D, preferably between −0.25 D and 25 D.

Each of the at least one GRIN optical elements may extend through the thickness of the film.

In the context of the present disclosure, photocured GRIN elements are GRIN elements that have been formed by photocuring, or photopolymerisation. Photocured GRIN elements may be produced from photopolymerisable or photocurable molecules or other photocurable elements. Photocuring may result in a transversely varying refractive index across the photocured region. Photocurable molecules may be dispersed within the film. Photocurable molecules may be dispersed within a cross-linked polymeric matrix, or within a resin.

Each of the at least one GRIN optical elements may have a radially varying refractive index profile defined by a quadratic function. Each of the at least one GRIN optical elements may have varying refractive index profile defined by a higher order polynomial function. Each of the at least one GRIN optical elements may have varying refractive index profile defined by a Gaussian function.

Each of the plurality of photocured GRIN elements may have the same variation in refractive index. Each of the plurality of photocured GRIN elements may have a different variation refractive index. Some of the photocured GRIN elements may have the same variation in refractive index, and other elements may have a different variation in refractive index. A plurality of photocured GRIN optical elements may be distributed such that photocured GRIN optical elements having the same or a similar variation in refractive index may be grouped in clusters or in an ordered arrangement. The film may be dividable into a plurality of distinct portions, with each portion comprising photocured GRIN optical elements having a different variation in refractive index.

Each of the at least one gradient index optical elements may have a width of between 10 μm and 10 mm. Each of the at least one GRIN optical elements may have a volume of between 100 μm$^3$ and 3 mm$^3$. The plurality of GRIN optical elements may occupy between 5% and 80% of the volume of the film. The plurality of gradient index optical elements may cover between 20% and 80% of a surface area of the film. The film may include between 2 and 5000 gradient index optical elements.

Each of the at least one GRIN optical elements may extend through the thickness of the film. Each of the at least one GRIN elements may extend through part of the thickness of the film. Each of the at least one GRIN elements may be dispersed within the film. Each of the at least one GRIN elements may be approximately cuboidal or spherical in shape.

When the film has been applied to the lens, the film may span the entire lens surface, or substantially all of the lens surface. Alternatively, the film may span a portion of a lens surface. The film may span a central portion of a lens surface, for example, a portion that is configured to be situated in front of a lens wearer's eye. The film may span an annular region surrounding the centre of the lens. There may be a peripheral region of the lens that is not spanned by the film.

The lens may have a central region and an annular region surrounding the central region. The film that includes each of the at least one gradient index optical elements may span a portion of the annular region. The film may not span the central region, and the central region may therefore be free from photocured GRIN optical elements. The film may span all of the annular region, or part of the annular region. As used herein, the term annular region refers to a region that may extend around the entire outer edge of the central region, or may extend partially around the outer edge of the central region. The annular region may be circular, oval or elliptical in shape. The annular region may include a plurality of photocured GRIN optical elements. The plurality of photocured GRIN optical elements may be distributed around the entire annular region, or may be distributed across a portion of the annular region. The film may include a plurality of concentric annular regions, and each of the concentric annular regions may include at least one photocured GRIN optical element. Each concentric annular region may include a plurality of photocured GRIN optical elements. A plurality of photocured GRIN optical elements may span a portion of each annular region. Using the angle θ to define the position around the annular region, wherein θ varies between 0° and 360°, a plurality of GRIN optical elements may cover the same range of θ angles for each annular region (i.e. the GRIN elements may be in phase for each annular region, with maxima and minima at the same θ values for each annular region), or may occupy different ranges of θ angles (i.e. the GRIN elements may be out of phase for each annular region, with maxima and minima at different θ values for each annular element). At least one GRIN element in a first annular region may therefore be out of phase with at least one GRIN element in an adjacent second annular region. At least one GRIN element in a first annular region may be in phase with at least one GRIN element in an adjacent second annular region.

If the film includes a plurality of concentric annular photocured GRIN optical elements, the variation in refractive index around each of the annular elements may be in phase (i.e. with maxima and minima at the same θ values for each annular element), or out of phase (i.e. with maxima and minima at different θ values for each annular element).

If the film includes a plurality of concentric annular regions, the variation in refractive index around each of the annular regions may be in phase, or out of phase.

The film may include a plurality of concentric annular regions that are radially separated by a region of the layer having the base refractive index. Alternatively, the film may include a plurality of concentric annular regions that are adjacent to each other, such that there is not a region having the base refractive index between the annular concentric gradient index optical elements.

The film may have a thickness of between 1 μm and 70 μm.

The film may be applied to an anterior surface of the lens. The film may be applied to the surface of the lens after photocuring. The film may be applied to the lens prior to photocuring. In the context of the present disclosure, the anterior surface of the lens is the forward facing, or exterior surface of the lens when the lens is being worn by a lens wearer. The film may be permanently applied to the lens. The film may be readily removable from the lens. The film may be re-usable, such that the film can easily be removed and reapplied to the same lens or to a different lens.

The ophthalmic lens may be a spectacle lens. The lens may be circular in shape. The lens may be elliptical in shape. The lens may be oval in shape. The lens may be rectangular in shape. The lens may be square in shape. The anterior surface of the lens may have an area of between 300 mm$^2$ and 5000 mm$^2$, preferably between 1000 mm$^2$ and 3000 mm$^2$. The lens may be formed from transparent glass or rigid plastic such as polycarbonate. The lens may be substantially planar and may have at least one curved surface providing a lens power.

The ophthalmic lens may be a contact lens. As used herein, the term contact lens refers to an ophthalmic lens that can be placed onto the anterior surface of the eye. It will be appreciated that such a contact lens will provide clinically acceptable on-eye movement and not bind to the eye or eyes of a person. The contact lens may be in the form of a corneal lens (e.g., a lens that rests on the cornea of the eye). In embodiments where the lens is a contact lens, the lens may have a surface area of between 60 mm$^2$ and 750 mm$^2$. The lens may have a circular shape. The lens may have an oval shape. The lens may have an elliptical shape. The lens may have a diameter of between 6 mm and 20 mm, preferably between 9 mm and 16 mm.

The lens may be a rigid contact lens. The lens may be a rigid, gas permeable contact lens.

The contact lens may be a toric contact lens. For example, the toric contact lens may include an optic zone shaped to correct for a person's astigmatism.

The lens may be a soft contact lens, such as a hydrogel contact lens or a silicone hydrogel contact lens.

The lens may comprise an elastomer material, a silicone elastomer material, a hydrogel material, or a silicone hydrogel material, or combinations thereof. As understood in the field of contact lenses, a hydrogel is a material that retains water in an equilibrium state and is free of a silicone-containing chemical. A silicone hydrogel is a hydrogel that includes a silicone-containing chemical. Hydrogel materials and silicone hydrogel materials, as described in the context of the present disclosure, have an equilibrium water content (EWC) of at least 10% to about 90% (wt/wt). In some embodiments, the hydrogel material or silicone hydrogel material has an EWC from about 30% to about 70% (wt/wt). In comparison, a silicone elastomer material, as described in the context of the present disclosure, has a water content from about 0% to less than 10% (wt/wt). Typically, the silicone elastomer materials used with the present methods or apparatus have a water content from 0.1% to 3% (wt/wt). Examples of suitable lens formulations include those having the following United States Adopted Names (USANs): methafilcon A, ocufilcon A, ocufilcon B, ocufilcon C, ocufilcon D, omafilcon A, omafilcon B, comfilcon A, enfilcon A, stenfilcon A, fanfilcon A, etafilcon A, senofilcon A, senofilcon B, senofilcon C, narafilcon A, narafilcon B, balafilcon A, samfilcon A, lotrafilcon A, lotrafilcon B, somofilcon A, riofilcon A, delefilcon A, verofilcon A, kalifilcon A, lehfilcon A, and the like.

Alternatively, the lens may comprise, consist essentially of, or consist of a silicone elastomer material. For example, the lens may comprise, consist essentially of, or consist of a silicone elastomer material having a Shore A hardness from 3 to 50. The Shore A hardness can be determined using conventional methods, as understood by persons of ordinary skill in the art (for example, using a method DIN 53505). Other silicone elastomer materials can be obtained from NuSil Technology or Dow Chemical Company, for example.

The lens may have an optic zone. The optic zone encompasses parts of the lens that have optical functionality. The optic zone is configured to be positioned over or in front of the pupil of an eye when in use. The optic zone may be surrounded by a peripheral zone. The peripheral zone is not part of the optic zone, but sits outside the optic zone. For a contact lens, the peripheral zone may sit above the iris when the lens is worn. The peripheral zone may provide mechanical function, for example, increasing the size of the lens thereby making the lens easier to handle. For a contact lens, the peripheral zone may provide ballasting to prevent rotation of the lens, and/or providing a shaped region that improves comfort for the lens wearer. The peripheral zone may extend to the edge of the lens. In embodiments of the present disclosure the film including at least one GRIN optical element may span the optic zone, but may not span the peripheral zone.

For a contact lens, the film may have a thickness of between 1 μm and 100 μm, preferably between 10 μm and 20 μm, and more preferably between 14 μm and 18 μm. For a spectacle lens, the film may have a thickness of between 1 μm and 1000 μm, preferably between 10 μm and 20 μm, and more preferably between 14 μm and 18 μm.

In the context of the present disclosure, the Digital Light Projection (DLP) system is a light illumination system that is used to direct light towards a photocurable film, thereby enabling a region of the film to be photocured. The DLP system used has a wavelength that is suitable for photopolymerisation or photocuring of the target film material. For example, for a Bayfol® HX film, the DLP system may have a wavelength in the range of between 440 nm to 660 nm. The pixel resolution of the DLP system may be less than 100 μm, preferably less than 30 μm, more preferably less than 10 μm. The DLP system may be a commercial DLP system, for example a 3DLP9000-LED.9"WQXGA Light Engine with a 460 nm wavelength and 30 nm pixel resolution. The DLP system may include a micro-electromechanical system (MEMS). The DLP system may include a digital mirror device. The digital mirror device may direct light, and/or control the transmission of light towards the film.

The DLP system may be used to illuminate the entire film, or a region of the film. The DLP system may be used to photocure an individual photocurable element or molecule, or a plurality of individual photocurable molecules. A plurality of individual photocurable molecules may be photocured successively or simultaneously. The DLP system may be used to illuminate an annular region of the film, or a plurality of concentric annular regions of the film.

Using the digital light projection system may comprise using a grayscale image to control projection of light onto the film. The grayscale image may provide a template for projecting light from the DLP system onto the film. The grayscale image may be a .bmp image. The grayscale image may mask some regions of the film, such that these regions are not exposed to light from the DLP system, whilst exposing at least one region of the film to light from the DLP system. The grayscale image may expose a plurality of regions to light from the DLP system. Regions of the film that are exposed to light from the DLP system may be photocured to produce photocured GRIN elements.

The film may include a plurality of photocured GRIN optical elements. The plurality of GRIN optical elements may be distributed across the whole film. The plurality of GRIN optical elements may be distributed across a portion of the film. The plurality of GRIN optical elements may be randomly distributed across all or a portion of the film. The GRIN optical elements may be arranged in a regular pattern across all or a portion of the film. The GRIN optical elements may be arranged on lattice points of a triangular lattice. The GRIN optical elements may be arranged on lattice points of a square or rectangular lattice. The GRIN optical elements may be arranged to form an annular pattern on the film. The annular pattern may leave a central region of the lens free from GRIN optical elements. The lens may have a central region having a diameter of up to 8 mm may be free from GRIN optical elements. The annular pattern may comprise a single annulus or a plurality of concentric annuli. A plurality of grayscale images may be used to control the projection of light onto a film.

The method of manufacturing the lens may comprise generating a design for the film, wherein the design has a desired pattern of photocured gradient index optical elements. The method may comprise producing the grayscale image using the design.

The grayscale image may be designed to generate any of the arrangements of photocured GRIN elements described above. The grayscale image may comprise a plurality of apertures that enable light from the DLP system to reach the film. Regions of the film that are illuminated by light from the DLP system may be photocured. The image may comprise a plurality of portions that block or mask light from reaching the film. Regions of the film that are not illuminated by light from the DLP system will not be photocured. The image may comprise a plurality of apertures arranged in a pattern. The desired pattern of photocured GRIN optical elements may be an array of GRIN optical elements arranged on lattice points of the film, and in this case, the image may comprise a plurality of apertures arranged on lattice points. The lattice may be a triangular lattice, a square lattice or cuboidal lattice.

The method may comprise modelling a desired refractive index profile for each of the at least one photocured GRIN elements, and determining least one light exposure condition required to generate the desired refractive index profile.

Modelling may be used to determine the intensity of light exposure and/or duration of light exposure and/or wavelength of light exposure required to photocure a GRIN element having a desired refractive index profile. The conditions may be dependent upon the characteristics of the DLP system, for example, the wavelength, intensity and type of light source. The conditions may be dependent upon film properties, for example, the film material and film thickness. The modelling may be performed using any suitable modelling software, for example MATLAB™. Modelling may be performed using experimental (measured) data, or theoretical (predicted) data. Predicted data may be based on known properties of the film material and/or the DLP system. The desired refractive index profile for each photocured GRIN element may be defined by a quadratic function, or may be approximated by a quadratic function. The desired refractive index profile for each photocured GRIN element may be defined by a higher order polynomial function, or may be approximated by a higher order polynomial function. The desired refractive index profile for each photocured GRIN element may be defined by a Gaussian function, or may be approximated by a Gaussian function. The desired refractive index profile may be modelled for a single photocured GRIN element, or for a plurality of photocured GRIN elements. For a film including a plurality of GRIN optical elements, the desired refractive index profile for each of the at least one photocured GRIN elements may be the same, or each photocured GRIN element may have different desired refractive index profiles.

The modelling step may comprise measuring or plotting a refractive index change map as a function of a light exposure condition. The light exposure condition may be light intensity, duration of exposure, or light wavelength. The map may be generated as a map that has a non-planar surface. The map may be generated as a 3D map. The map may be iteratively updated and/or optimised to generate a desired refractive index profile for a photocured GRIN element. The map may be a refractive index change map for a single photocured GRIN element or for a plurality of photocured GRIN elements. The map may be used to generate a refractive index gradient pixel matrix for use in the DLP imaging system. The pixel matrix may identify required light exposure conditions for each pixel of the DLP imaging system to generate the required refractive index variation across the film. The refractive index gradient pixel matrix may be configured to generate a single photocured GRIN element, or between 2 and 5000 photocured GRIN elements distributed across the film. The refractive index gradient pixel matrix may be configured to generate photocured GRIN elements across between 20% and 80% of the area of the film.

The modelling step may include converting a refractive index change map into a digital light projection intensity map. The digital light projection intensity map may be a pixel matrix for the DLP system. The digital light projection intensity map may be generated from a refractive index gradient pixel matrix. The digital light projection intensity map may be used when generating a grayscale image for use in the DLP system. The digital light projection intensity map maybe used to determine the required exposure conditions for use in the DLP system. The DLP intensity map may be used to produce a .bmp image. The image may be an 8-bit image. The light exposure conditions may be dependent upon the film type, the required pattern or arrangement of photocured GRIN elements, the film properties, and the properties of the DLP imaging system. The digital light projection intensity map may therefore be used to control projection of light onto the film by determining the required exposure conditions.

The method may comprise exposing the film to light from the DLP, using a grayscale image and/or a digital light projection intensity map to control the projection of light onto the light exposure across the film. The method may comprise waiting for a minimum amount of time for the film to develop. The method may comprise, after waiting for a minimum time for the film to develop, flood curing or flood exposing the film using the DLP system or using a UV Oven.

The DLP system may include optics that cause non-linear intensity responses. The method may involve determining whether significant non-linear responses exist at any or all pixels. If significant non-linear responses exist, the method may comprise adapting the digital light projection intensity map to account for the non-linear responses.

The desired refractive index profile for each of the at least one GRIN optical elements may give rise to a photocured GRIN optical element having a diameter of between about 1 mm and 3.5 mm. The modelled refractive index profile may be configured to generate at least one photocured GRIN optical element having a diameter of between about 1 mm and 3.5 mm. The modelled refractive index profile may be optimised or iteratively optimised to generate at least one photocured GRIN optical element having a diameter of between about 1 mm and 3.5 mm. The desired refractive index profile for each of the at least one photocured GRIN optical elements may give rise to photocured GRIN elements having a volume of between 500 $\mu m^3$ and 30 $mm^3$. The desired refractive index profile for each of the at least one photocured GRIN optical elements may give rise to disc-shaped photocured GRIN elements or spherical photocured GRIN elements. The modelled refractive index profile may be optimised or iteratively optimised to generate at least one photocured GRIN optical elements having any of the characteristics described above.

The method may comprise applying the film to the surface of the lens after photocuring. The film may be disposed on a substrate for photocuring, before being removed from the substrate and applied to the lens. The substrate may be a glass slide or substrate. The film may be applied to the surface of the lens prior to photocuring. The film may be adhered to the surface of the lens using an adhesive such as an epoxy-based adhesive. The adhesive may be an adhesive layer. The adhesive layer may be applied to an anterior surface of the lens during manufacture of the lens. The adhesive layer may be applied to a posterior surface of the film prior to application of the film to the lens surface. The adhesive may permanently adhere the film to the surface of the lens. The adhesive may releasably adhere the film to the surface of the lens.

Prior to applying the film to the lens, which may be before or after photocuring a region of the film, the film may be cut or shaped to be suitable for application to an ophthalmic lens. The film may be cut or shaped to cover the entire surface of the lens, or a part of the surface of the lens. The film may be cut or shaped to be circular, oval, or elliptical. The film may be cut or shaped to cover the optic zone of the lens, or a region of the lens that will be positioned in front of a lens wearer's retina when the lens is being worn by a lens wearer.

Prior to photocuring, a protective layer may be applied to a surface of the film. The method may comprise removing the protective layer prior to photocuring. The protective layer may comprise polypropylene.

After applying the photocured film to the lens, the method may comprise applying a protective layer to the anterior surface of the lens (i.e. on top of the photocured layer). The protective layer may cover all or part of the anterior surface of the film that includes at least one photocured GRIN optical element. The protective layer may be a transparent layer. The protective layer may comprise polycarbonate (PC). The protective layer may comprise polyethylene terephthalate (PET) or cellulose triacetate (TAC). The protective layer may comprise a substance that has negligible birefringence. The protective layer may be impermeable to water. The protective layer may be scratch resistant. The protective layer may have the base refractive index. The protective layer may offer a degree of UV protection. The protective layer may be adhered to the film including at least one photocured GRIN optical element using an adhesive.

FIG. 1 is a flow chart showing a method 100 of manufacturing an ophthalmic lens for use in myopia control, according to an embodiment of the present disclosure. In a first step 103, an ophthalmic lens is provided, and in a second step 105 a photocurable film is provided. In a third step 107, Digital Light Projection (DLP) is used to produce at least one photocured GRIN element inside the photocurable film. A DLP system will direct light towards the photocurable film and will illuminate a region of the film, and will thereby produce at least one photocured GRIN element. In a fourth step 109 the film is applied to a surface of the ophthalmic lens.

Figure 2A:
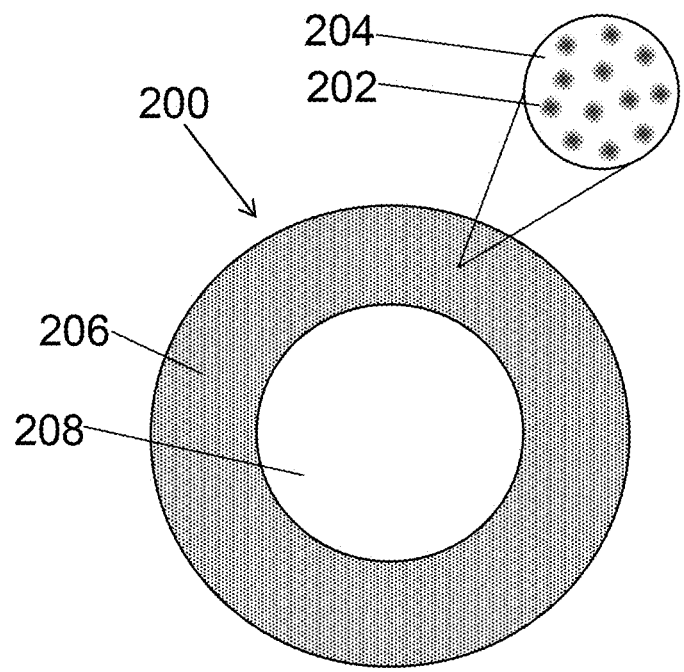
FIG. 2A is a schematic top view of a film including a plurality of photocured GRIN optical elements, according to an embodiment of the present disclosure.

FIG. 2A is a schematic top view of a film 200 for applying to an ophthalmic lens, including a plurality of photocured GRIN optical elements 202, produced using a method according to an embodiment of the present disclosure. The film 200 has an annular 206 region surrounding a central region 208, and the annular region 206 includes a plurality of GRIN optical elements 202. The GRIN optical elements 202 each have a gradient of refractive index that varies continuously and transversely across the element 202 and each element 202 has the same variation in refractive index. The base refractive index of the film 200 is constant and the film has a uniform thickness. The film 200 has a circular planform shape. In this example, each GRIN element 202 has a higher average refractive index than the base refractive index. The GRIN optical elements 202 are distributed at regular intervals across the surface of the annular region 206 of film 200. The central region 208 of the film 200 does not contain any GRIN optical elements 202. Each of the GRIN optical elements 202 is a photocured optical element. When light falls incident on the GRIN optical elements 202 it is scattered more in comparison to light falling incident on the area 204 of the film 200 that does not contain optical elements.

Figure 2B:
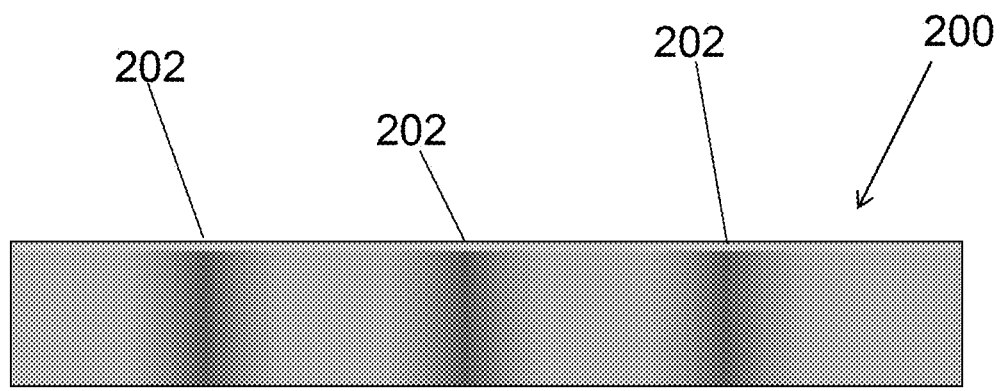
FIG. 2B is a side view of the film of FIG. 2A.

FIG. 2B is a side view of the film 200 of FIG. 2A. The photocured GRIN optical elements 202 extend through the thickness of the film 200 and are distributed at regular intervals across the surface of the film 200.

Figure 3:
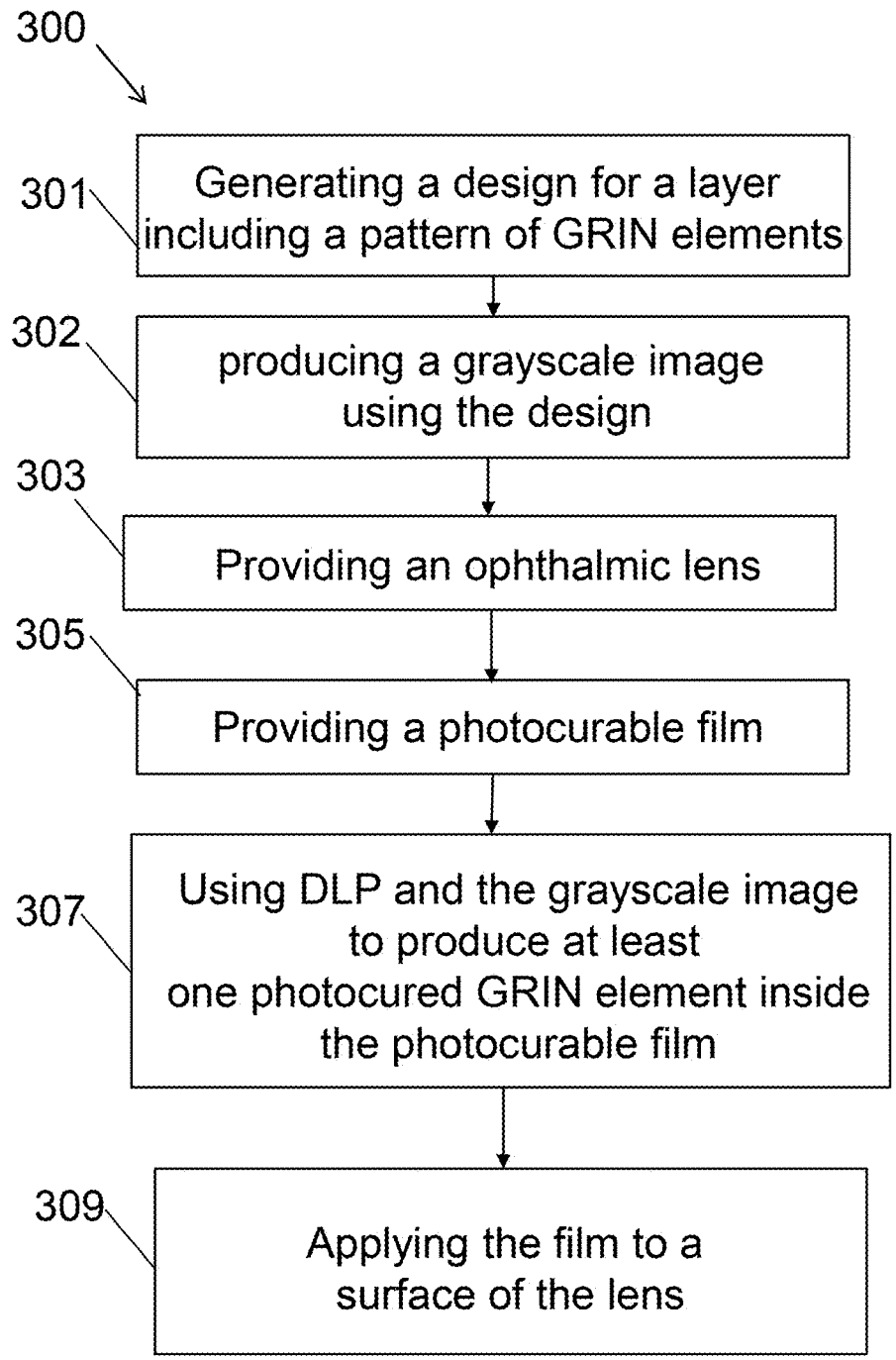
FIG. 3 is a flow chart showing a method of manufacturing an ophthalmic lens using a grayscale image, according to an embodiment of the present disclosure.

FIG. 3 is a flow chart showing a method 300 of manufacturing an ophthalmic lens using a greyscale image, according to an embodiment of the present disclosure. In a first step 301, a design is generated for a film including a pattern of the GRIN optical elements. In a second step 302, the pattern is used to create a greyscale image. In a third step, an ophthalmic lens 303 is provided, and in a fourth step, a photocurable film is provided 305. The greyscale image is used to provide a template for projecting light from the digital light projection system onto the film. The greyscale image masks some regions of the film, so that these regions are not exposed to light, while allowing other regions to be exposed to light. Regions of the film that are exposed to light from the DLP system will be photocured to produce GRIN optical elements. Therefore, in step five 307, using DLP and the grayscale image, at least one photocured GRIN element is produced inside the photocurable film. In the final step 309, the film is applied to a surface of the lens.

Figure 4:
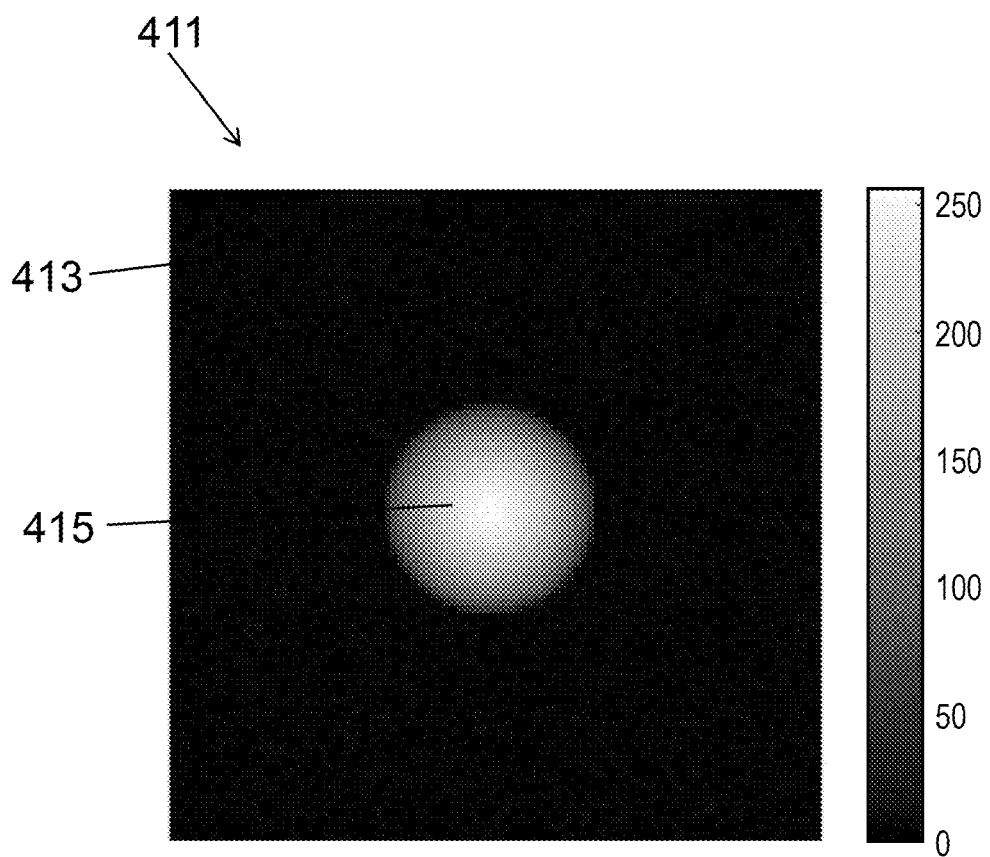
FIG. 4 is a grayscale image that may be used to control light from a DLP to produce a single photocured GRIN optical element.

FIG. 4 is a greyscale image 411 that maybe used in a method according to an embodiment of the present disclosure. The dark area 413 of the greyscale image 411 indicate regions that will not be exposed to light. The lighter area 415 of the greyscale image 411 indicates regions that will allow light to pass through. Regions of a film that are exposed to light will be photocured to produce a photocured GRIN element.

Figure 5A:
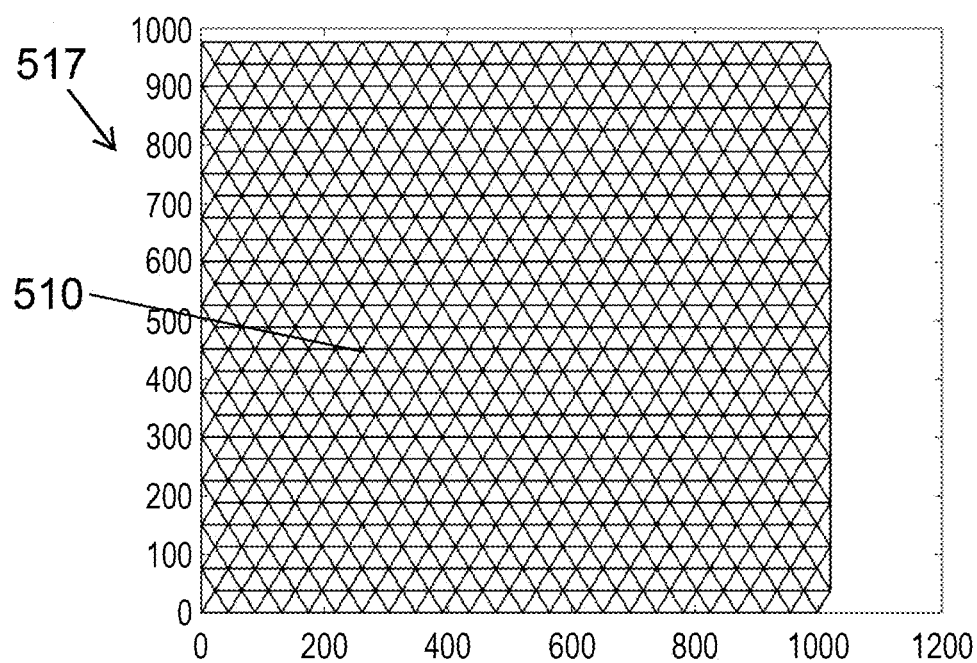
FIG. 5A is a schematic diagram of a lattice that may define desired locations for photocured GRIN elements, according to an embodiment of the present disclosure.

FIG. 5A is a schematic diagram 517 of a lattice that may be used to define desired locations for photocured GRIN elements, in methods according to embodiments the present disclosure. The lattice has a triangular lattice pattern. Each lattice point 510 may define the location where a GRIN optical element is created on a photocurable film. The lattice pattern may be used to produce a greyscale image 511 as shown in FIG. 5B.

Figure 5B:
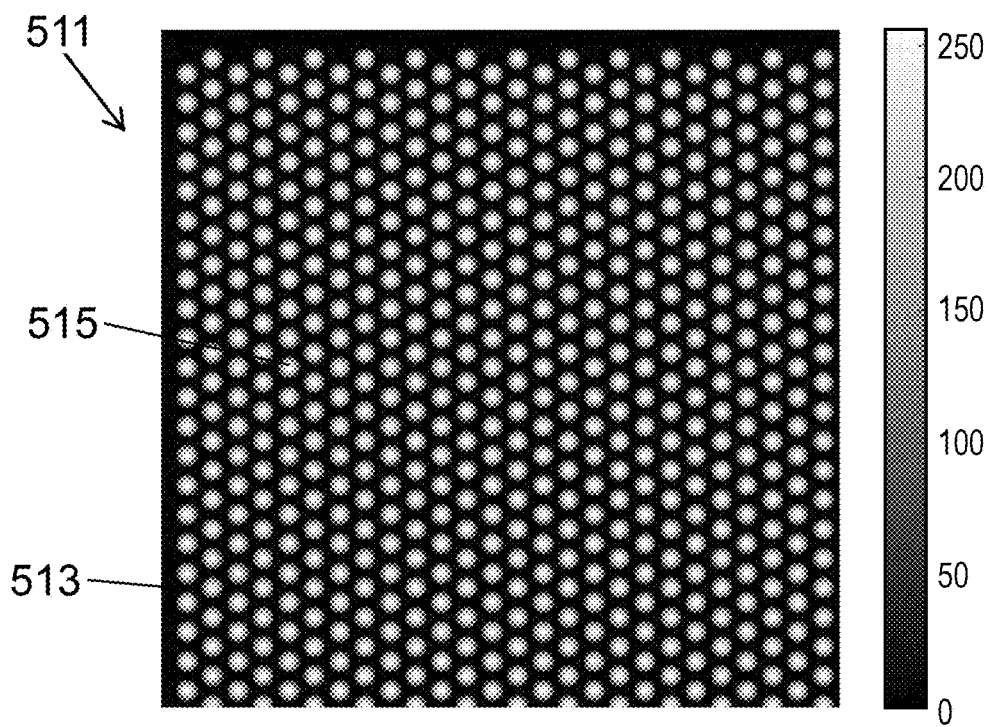
FIG. 5B is a grayscale image that may be used to control light from a DLP to produce a triangular lattice arrangement of photocured GRIN optical elements.

FIG. 5B is a greyscale image 511 that may be used to control light from a DLP to produce a triangular lattice arrangement of photocured GRIN optical elements. This greyscale image 511 comprises a plurality of apertures 515 arranged in a pattern. These align with the lattice points 510 of the pattern shown in FIG. 5A. This greyscale image 511 can be used to control light from a DLP system to produce a plurality of photocured GRIN optical element arranged on the lattice points 510 of a triangular lattice. The dark areas 513 of the greyscale image are used to mask regions of the photocurable film so that the regions are not exposed to light. The light apertures 515 in the greyscale image 511 allow light from the DLP system through and therefore allow regions of the film to be exposed to light. This causes the exposed regions of film to be photocured to produce a plurality of photocured GRIN elements.

Figure 6:
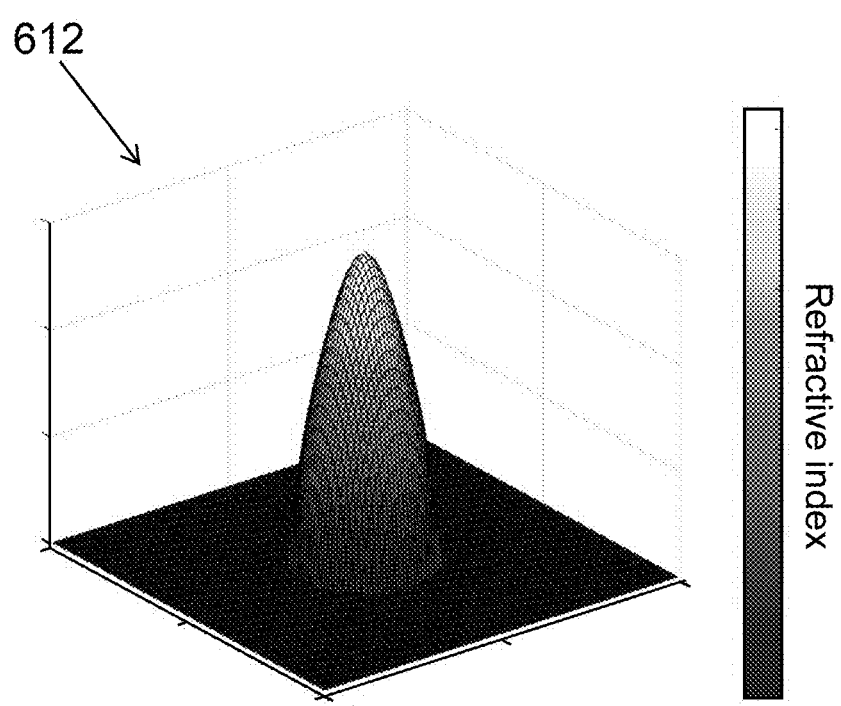
FIG. 6 is a 3D plot showing a modelled refractive index profile for a GRIN optical element having a quadratic refractive index profile.

FIG. 6 is a 3D plot 612 showing a modelled refractive index profile for a GRIN optical element having a quadratic refractive index profile. The GRIN element has a varying refractive index defined by a quadratic function in 3 dimensions, such that the greatest refractive index is at the centre of the element, and the refractive index decreases radially outwards from the centre of the element. The variation in refractive index causes increased scattering of light that is incident upon the GRIN optical element in comparison to an area of film that does not contain a GRIN optical element.

Figure 7:
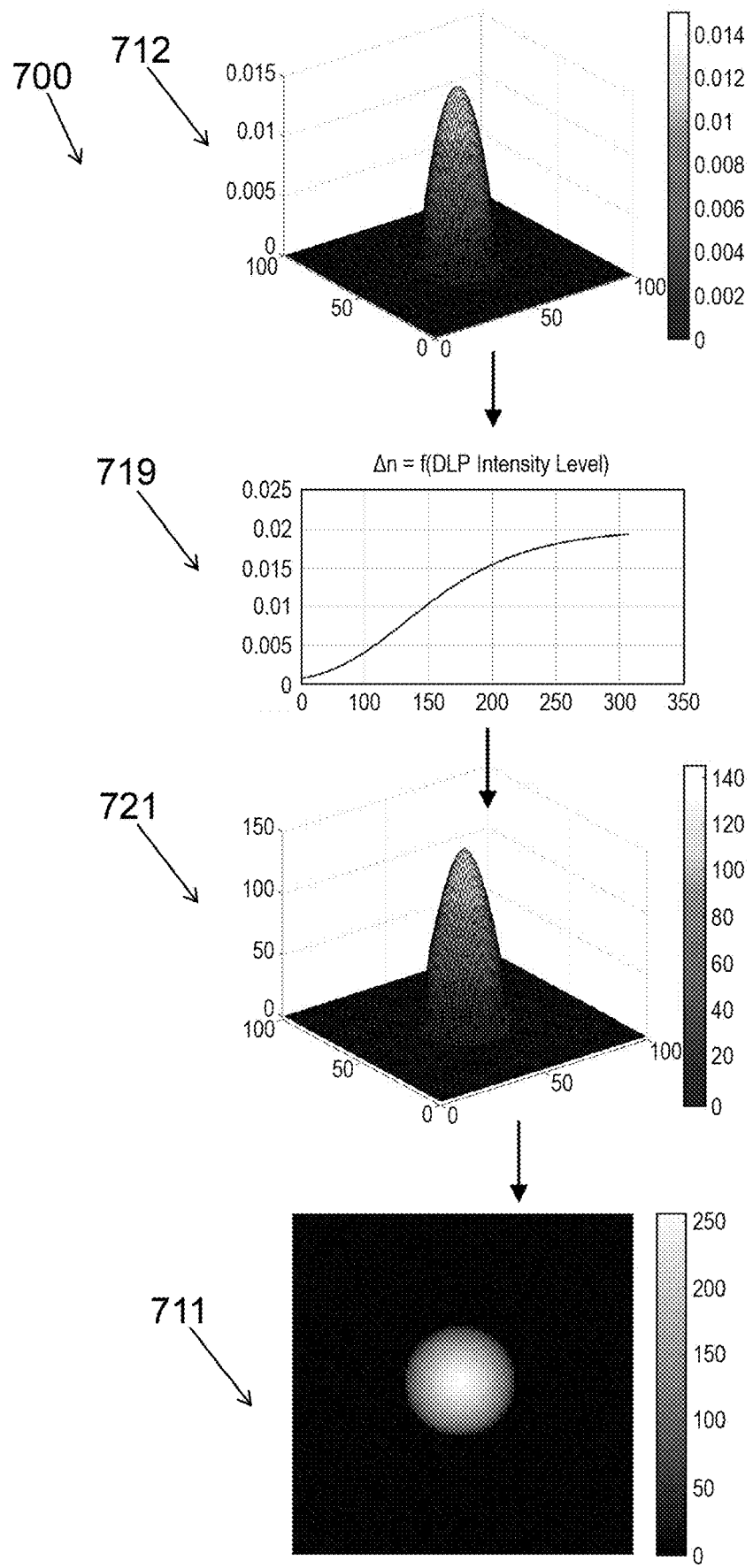
FIG. 7 is a flowchart showing the conversion of a modelled desired refractive index profile to a light intensity map, for use in a method according to an embodiment of the present disclosure.

FIG. 7 is a flowchart 700 showing the steps of converting a modelled desired refractive index profile to a light intensity map, for use in a method according to an embodiment of the present disclosure. The flowchart starts from a graph of a modelled refractive index profile for a GRIN element 712, which is similar to the profile shown in FIG. 6. A refractive index change versus intensity response plot 719 is used to characterise, for a particular film and DLP system, the light exposure required to produce a particular refractive index change. Using this plot 719 and the modelled refractive index profile a digital light projection intensity map 721 can be generated, which is a pixel matrix for the DLP system. This is used to generate a greyscale image 711, which contains the required exposure conditions for use in the DLP system. A photocurable film can then be exposed to light from the DLP, using the greyscale image 711 to control the pattern of light exposure experienced by the film. A photocured GRIN optical element will be produced on a surface of the film.

Figure 8:
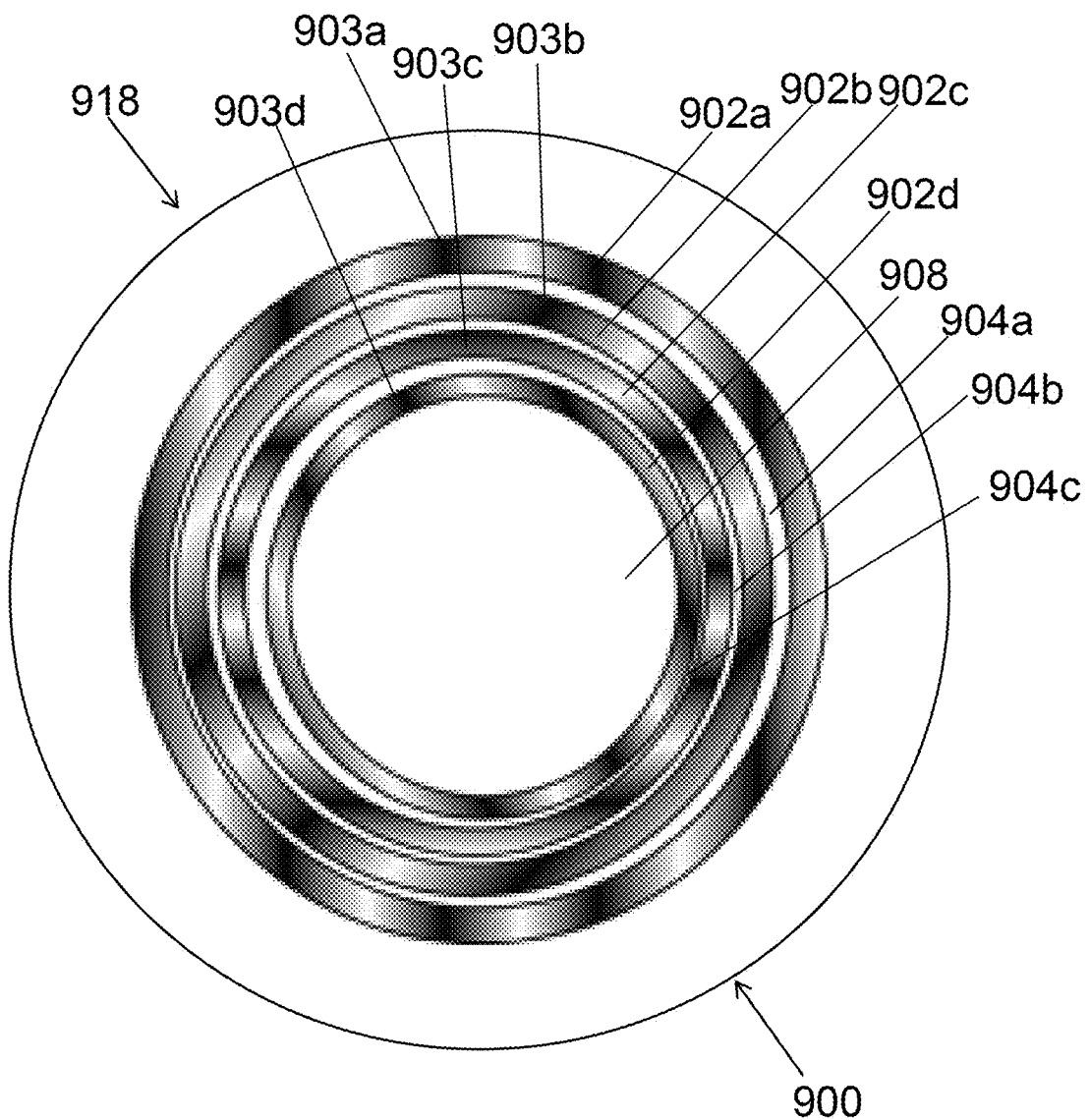
FIG. 8 is a schematic top view of a lens having a film including a plurality of concentric annular photocured GRIN optical elements, produced using a method according to an embodiment of the present disclosure.

FIG. 8 is a top view of a lens 918 having a film 900 including a plurality of concentric annular regions 902a-d surrounding a central region 908, produced using a method according to an embodiment of the present disclosure. Each annular region 902a-d includes a plurality of GRIN optical elements 903a-d, indicated by shading, with darker shading indicating maximum higher refractive index. The variation in refractive index around each of the annular regions 902a-d is out of phase with the variation of the annular immediately adjacent to that annular region. For example, the variation in refractive index around element 902a is out of phase with the variation around element 902b. The concentric annular regions 902a-d are radially separated by a regions of film 904a-c that have the base refractive index. In other embodiments of the present disclosure (not shown), concentric annular regions may be adjacent to each other, i.e., not separated by regions having the base refractive index.

Figure 9:
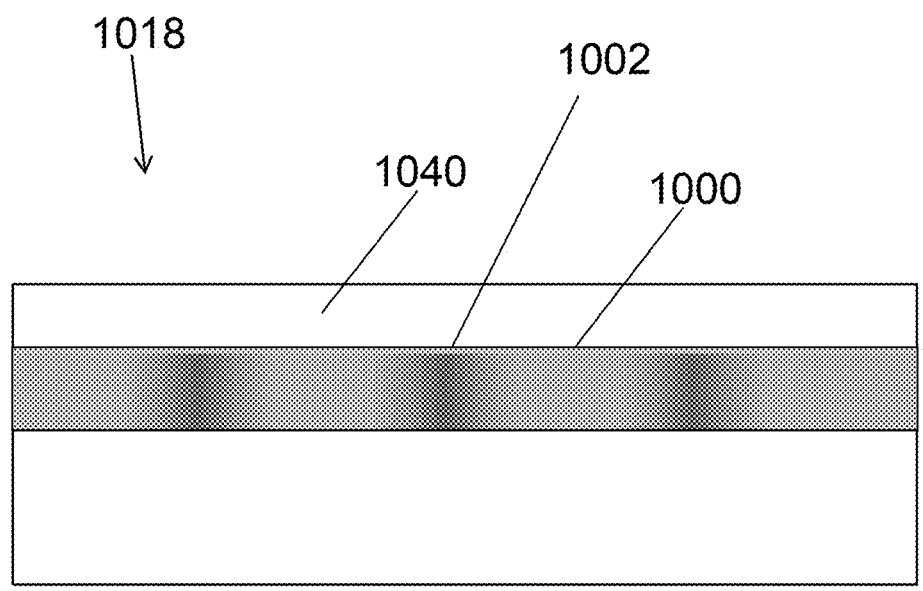
FIG. 9 is a schematic side view of an ophthalmic lens manufactured using a method according to an embodiment of the present disclosure, the lens having a protective layer applied to the anterior surface of the lens, and an adhesive layer adhering the film to the surface of the lens.

FIG. 9 is a side view of an ophthalmic lens 1018, manufactured using a method according to an embodiment of the present disclosure. The lens 1018 has a film 1000 with a base refractive index adhered to the anterior surface of the lens by an adhesive. A protective layer 1040 is attached to the anterior surface of the film 1000 by an adhesive. The film 1000 includes a plurality of GRIN elements 1002, which are photocured using a method according to an embodiment of the present disclosure. The GRIN optical elements 1002 are distributed at regular intervals across the surface of the film 1000. The GRIN optical elements 1002 each have a gradient of refractive index that varies continuously and transversely across the element 1002 and each element 1002 has the same variation in refractive index. The base refractive index of the film 1000 is constant and the film has a uniform thickness. The protective layer 1040 is a transparent layer that covers the entire anterior surface of the film 1000 and is resistant to water and scratches.

Figure 10:
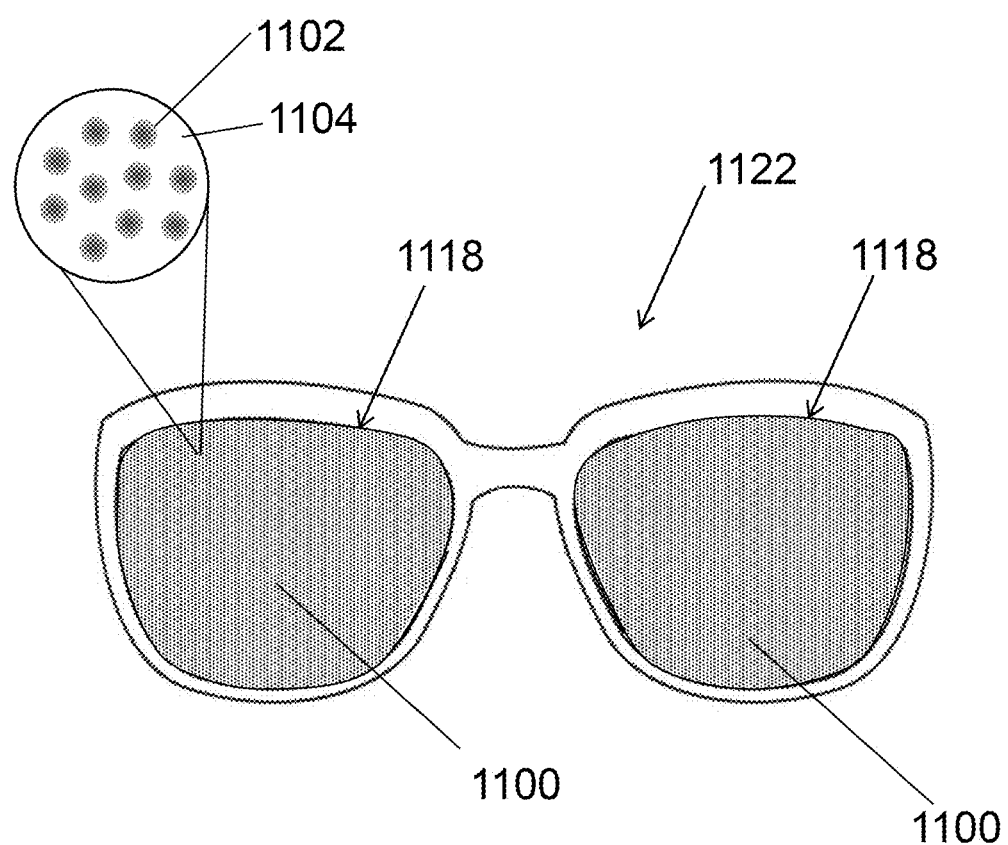
FIG. 10 is a schematic front view of a pair of spectacles including lenses manufactured according to methods of the present disclosure.

FIG. 10 is a front view of a pair of spectacles 1122, including lenses 1118 manufactured according to methods of the present disclosure. Each lens 1118 has a layer having a base refractive index provided on an anterior surface of the lens, the layer including a plurality of GRIN optical elements 1102. The layer is a film 1100 that has been applied to the spectacle lens 1118. The base refractive index of the film 1100 is constant and the film has a uniform thickness. The film 1100 includes a plurality of GRIN optical elements 1102. The film 1100 has a circular planform shape. Each of the GRIN optical elements 1102 has an average refractive power that is greater than the base refractive power of the film 1100. The GRIN optical elements 1102 each have a gradient of refractive index that varies continuously and transversely across the element 1102 and each element 1102 has the same variation in refractive index. Light that is incident on the GRIN elements 1102 is scattered more in comparison to light that falls incident on the remainder of the film 1100 that has the base refractive index. The grin elements 1102 are spherical in shape and are distributed at regular intervals across an anterior surface of the film 1100, spanning about 70% of one of the surfaces of the film. Light that is incident on the GRIN elements 1102 is scattered more in comparison to light that falls incident on the remainder of the film 1104 that has the base refractive index. The pair of spectacles 1122 contains two of these lenses 1118.

Figure 11:
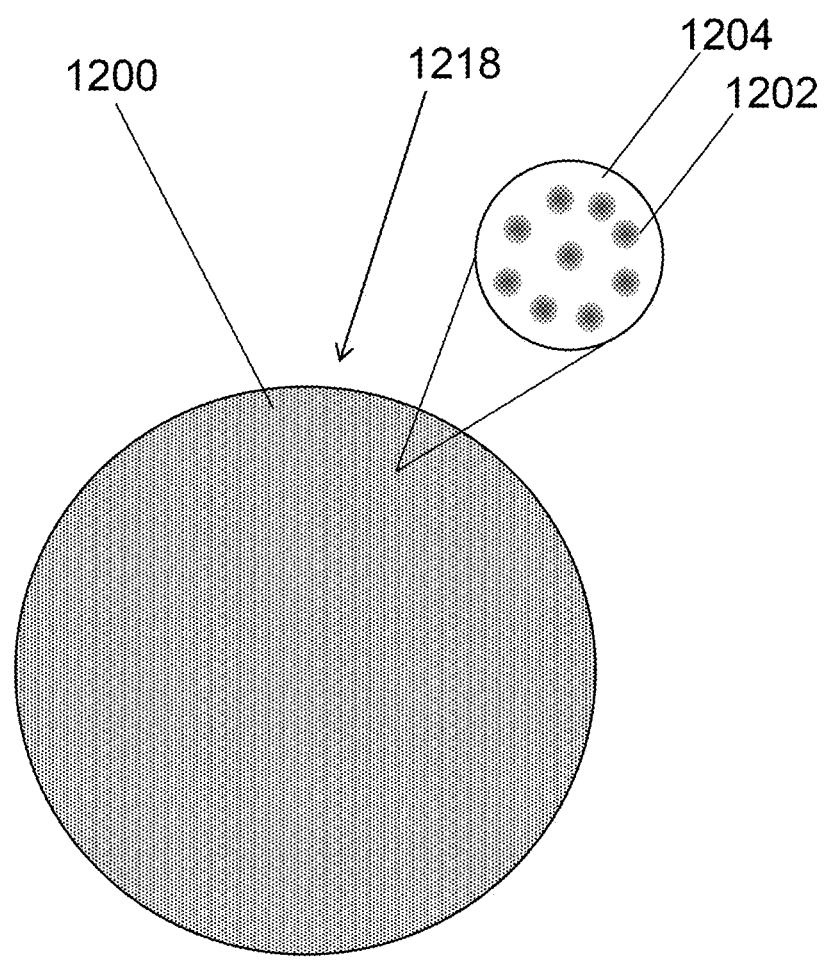
FIG. 11 is a schematic front view of a contact lens manufactured according to methods of the present disclosure.

FIG. 11 is a front view of a contact lens 1218, manufactured according to methods of the present disclosure. The anterior surface of the lens 1218 has a layer 1200, which has a base refractive index and includes a plurality of GRIN optical elements 1202. The layer 1200 is a film. The film 1200 spans the entire anterior surface of the lens 1218 and has a uniform thickness. The GRIN elements 1202 span about 70% of the surface of the film. GRIN optical elements 1202 are distributed at regular intervals across the surface of the film 1200. Each of the GRIN optical elements 1202 has an average refractive power that is greater than the base refractive power. The GRIN optical elements 1202 each have a gradient of refractive index that varies continuously and transversely across the element 1202 and each element 1202 has the same variation in refractive index. Light that is incident on the GRIN elements 1202 is scattered more in comparison to light that falls incident on the remainder of the film 1204 that has the base refractive index.

Whilst the present disclosure has been described and illustrated with reference to particular embodiments, it will be appreciated by those of ordinary skill in the art that the disclosure lends itself to many different variations not specifically illustrated herein. By way of example only, certain possible variations will now be described.

In example embodiments of the present disclosure, each GRIN element may have an average refractive index that is higher than the base refractive index. In other example embodiments, each GRIN element may have an average refractive index that is lower than the base refractive index.

Whilst in the foregoing description, integers or elements are mentioned which have known obvious or foreseeable equivalents, then such equivalents are herein incorporated as if individually set forth. Reference should be made to the claims for determining the true scope of the present disclosure, which should be construed as to encompass any such equivalents. It will also be appreciated by the reader that integers or features of the disclosure that are described as advantageous, convenient or the like are optional, and do not limit the scope of the independent claims. Moreover, it is to be understood that such optional integers or features, whilst of possible benefit in some embodiments of the disclosure, may not be desirable and may therefore be absent in other embodiments.

The invention claimed is:
1. A method of manufacturing an ophthalmic lens comprising:
 providing an ophthalmic lens;
 providing a photocurable film;
 using a digital light projection system to photocure at least one region of the film, thereby producing a plurality of photocured gradient index refractive elements; and
 applying the film to a surface of the lens.

2. The method according to claim 1, wherein using the digital light projection system comprises to control projection of light from the system onto the film using a grayscale image.

3. The method according to claim 2, wherein the method comprises:
generating a design for the film, wherein the design has a desired pattern of photocured gradient index optical elements; and
producing the grayscale image using the design.

4. The method according to claim 3, wherein the desired pattern of gradient index optical elements comprises an array of gradient index optical elements arranged on lattice points of the film.

5. The method according to claim 1, wherein the method comprises modelling a desired refractive index profile for each of the plurality of photocured gradient index optical elements; and determining at least one light exposure condition required to generate the desired refractive index profile.

6. The method according to claim 5, wherein the desired refractive index profile for each of the plurality of photocured gradient index optical elements is defined by a quadratic function.

7. The method according to claim 5, wherein the modelling step comprise measuring or plotting a refractive index change map as a function of a light exposure condition.

8. The method according to claim 7, wherein the modelling step includes converting the refractive index change map into a digital light projection intensity map for controlling the projection of light onto the film.

9. The method according to claim 8, comprising determining whether the digital light projection system gives rise to a significant non-linear response, and incorporating any significant non-linear responses into the digital light projection intensity map.

10. The method according to claim 5, wherein the desired refractive index profile for each of the plurality of photocured gradient index optical elements gives rise to photocured gradient index optical element having a diameter of between about 1 mm and about 3.5 mm.

11. The method according to claim 1, wherein the digital light projection system includes a digital mirror device.

12. The method according to claim 1, wherein the digital light projection system has an illumination wavelength of between 440 nm and 660 nm.

13. The method according to claim 1, wherein the pixel resolution of the digital light projection system is less than 100 μm.

14. The method according to claim 1, wherein the method comprises applying the film to the surface of the lens after photocuring.

15. The method according to claim 1, wherein the step of applying the film to a surface of the lens comprises adhering the film to the lens using an adhesive.

16. The method according to claim 1, comprising cutting or shaping the film to be suitable for application to the ophthalmic lens.

17. The method according to claim 1, wherein the ophthalmic lens is a spectacle lens.

18. The method according to claim 1, wherein the ophthalmic lens is a contact lens.

* * * * *